(No Model.) 7 Sheets—Sheet 2.

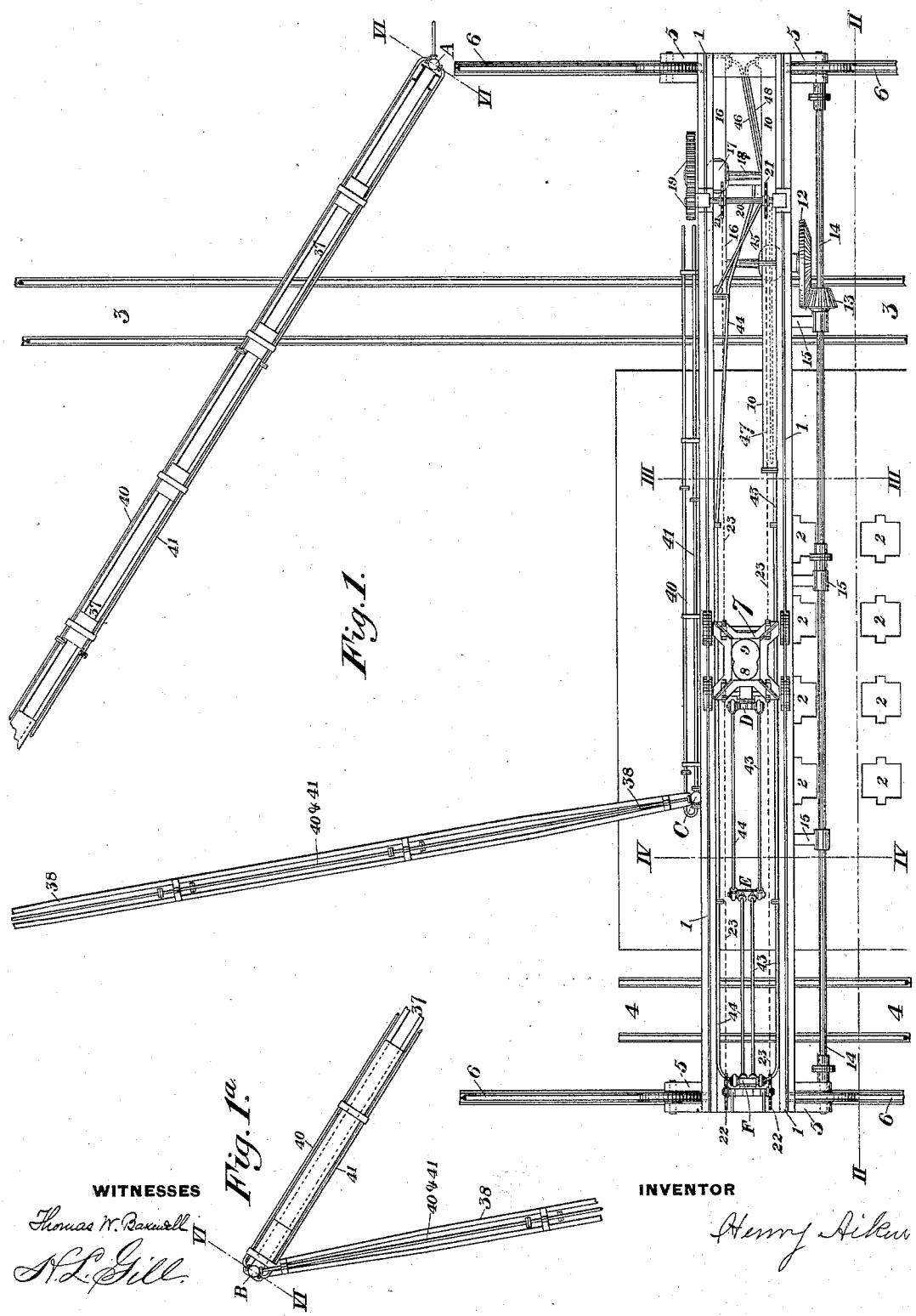

H. AIKEN.
MILL APPLIANCE.

No. 448,623. Patented Mar. 24, 1891.

WITNESSES
Thomas W. Bakewell
H. L. Gill

INVENTOR
Henry Aiken

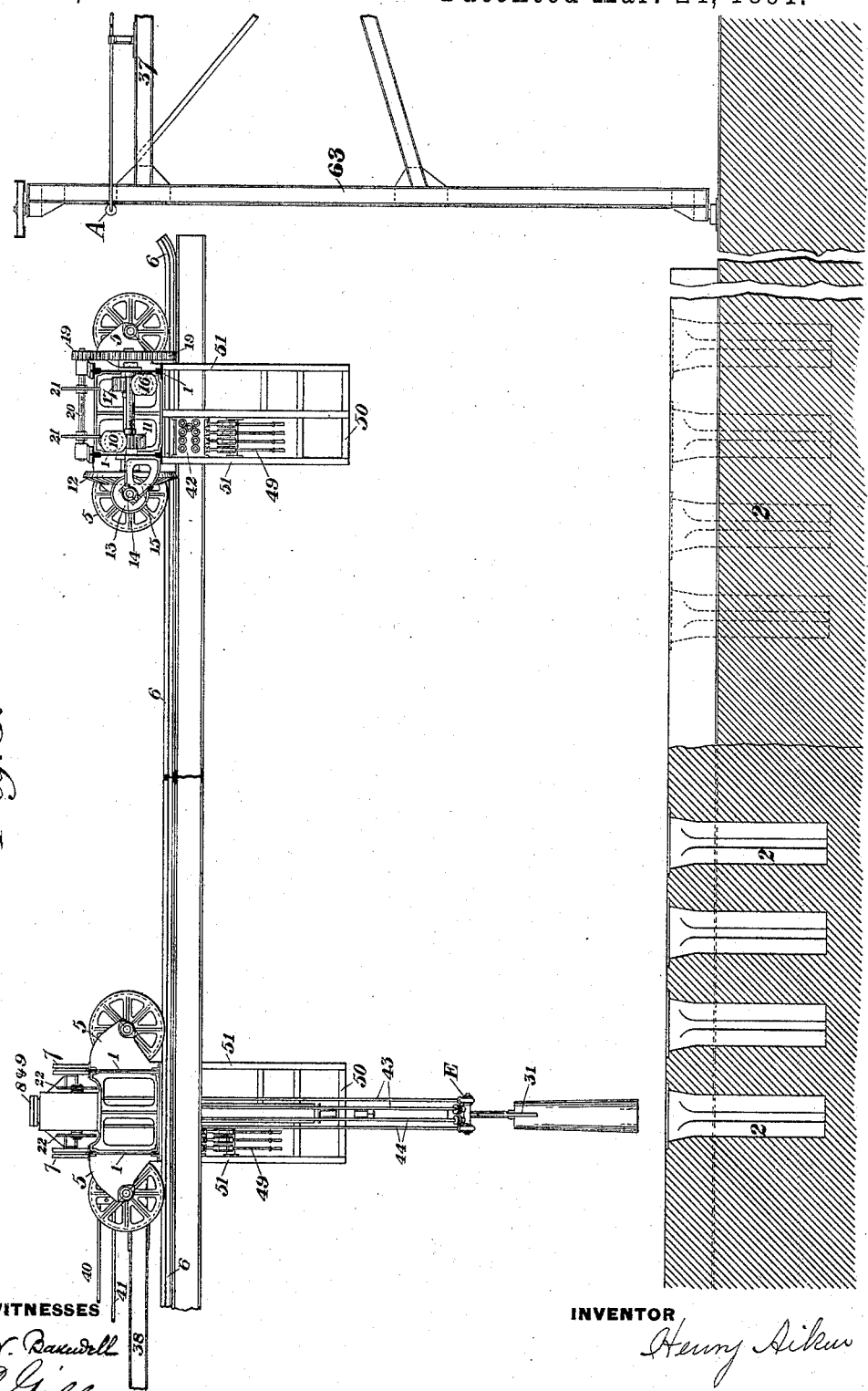

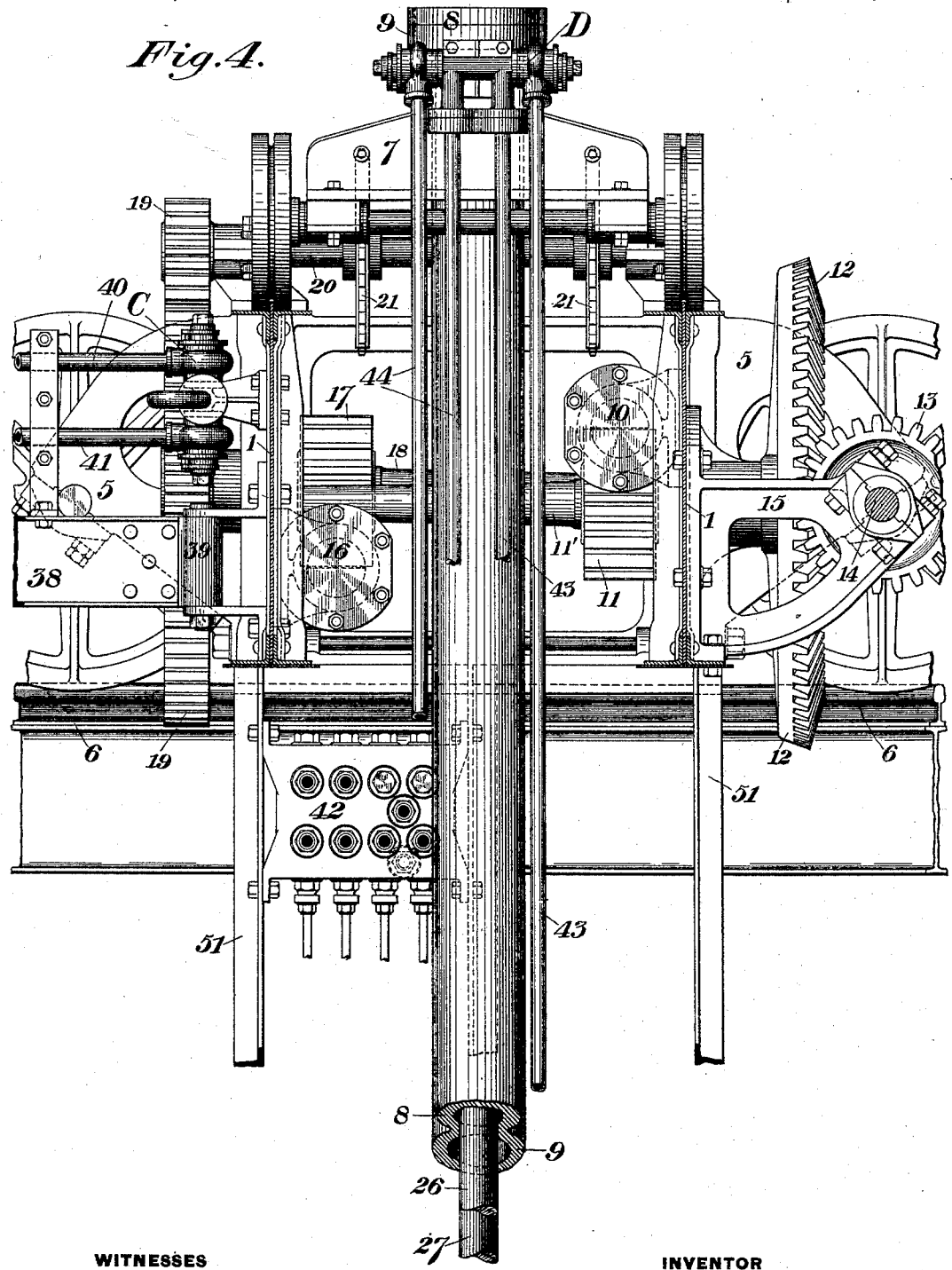

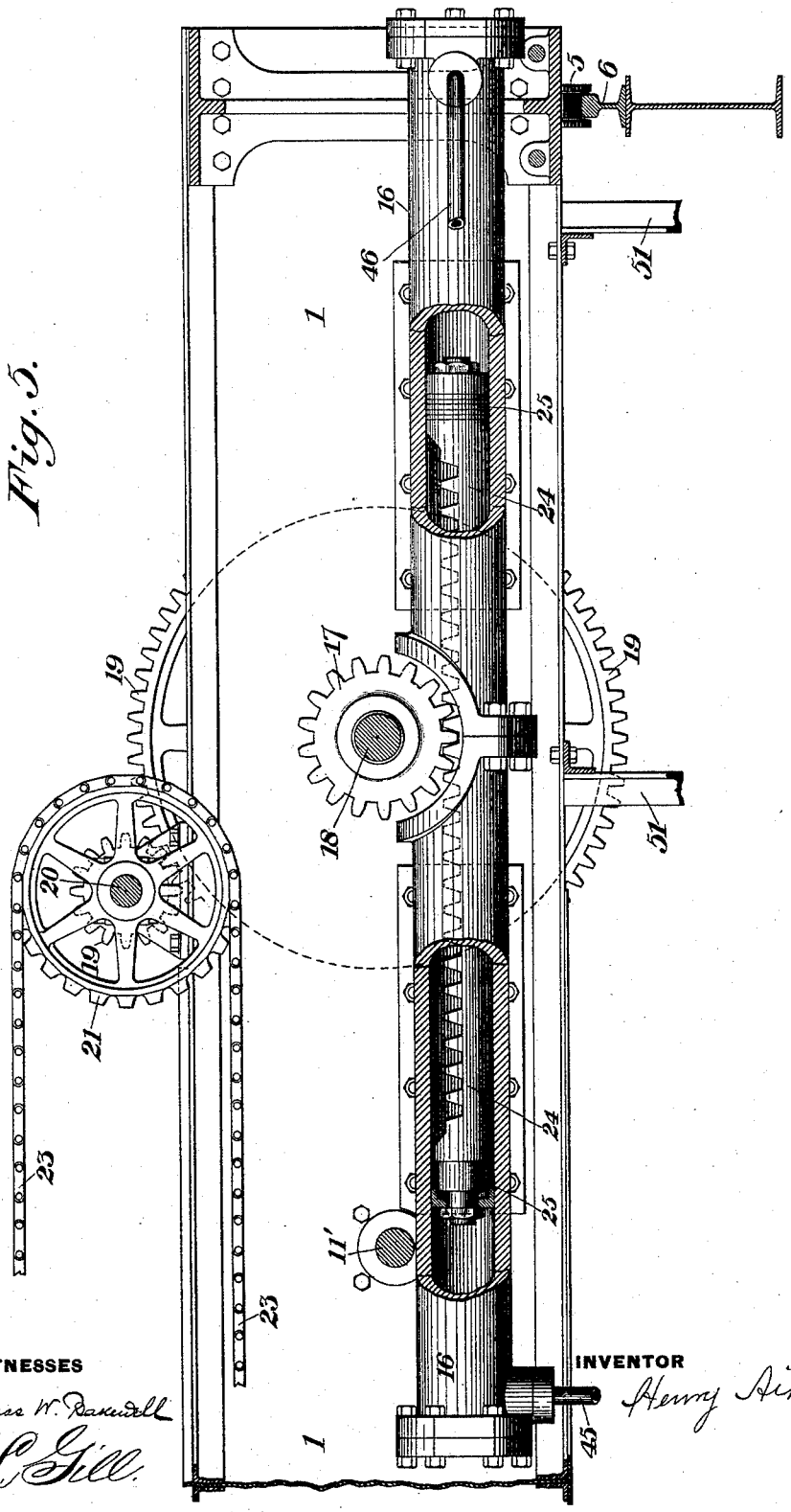

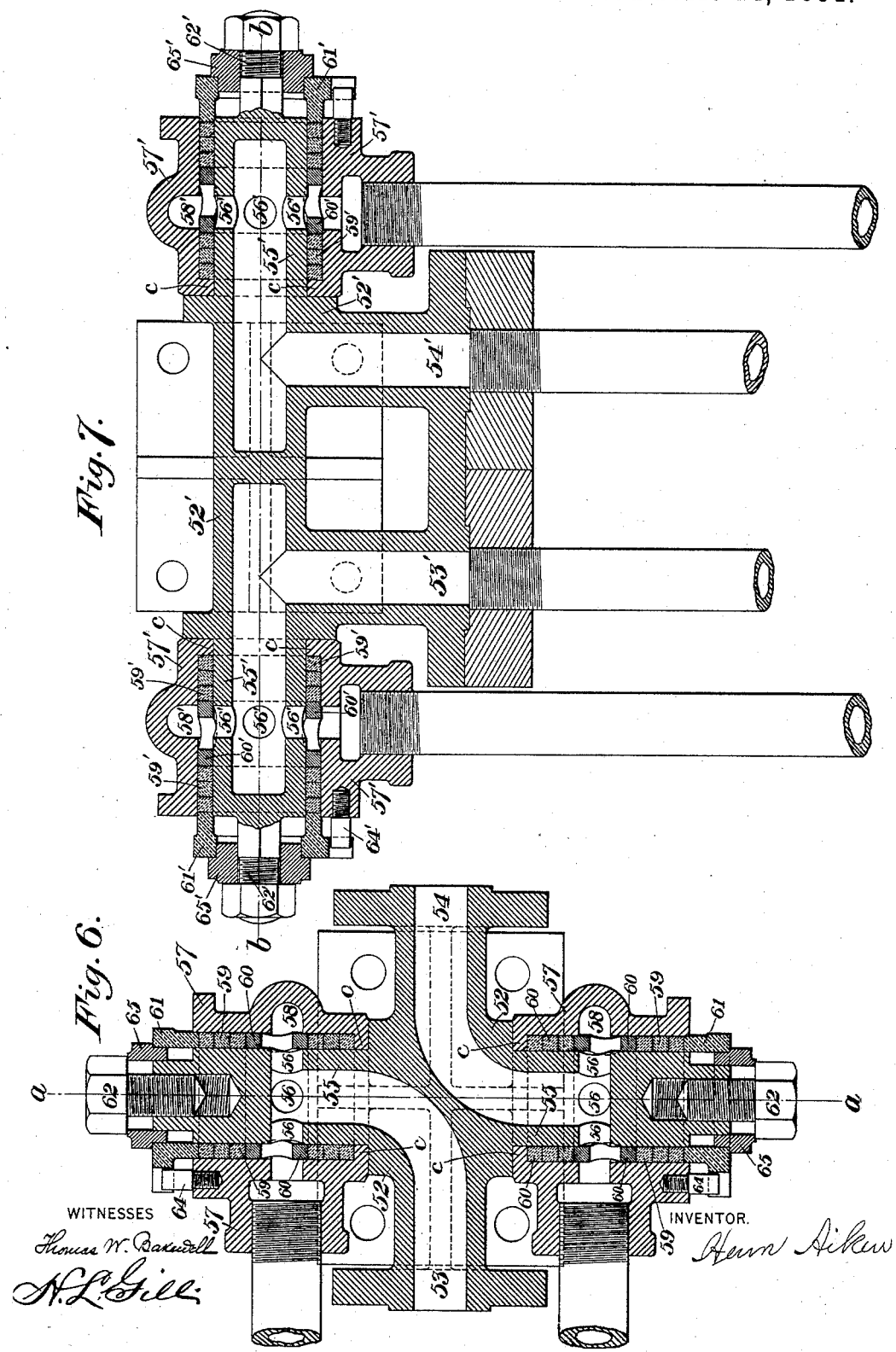

(No Model.) 7 Sheets—Sheet 7.

H. AIKEN.
MILL APPLIANCE.

No. 448,623. Patented Mar. 24, 1891.

WITNESSES
Thomas W. Bakewell
N. L. Gill

INVENTOR
Henry Aiken

UNITED STATES PATENT OFFICE.

HENRY AIKEN, OF PITTSBURG, PENNSYLVANIA.

MILL APPLIANCE.

SPECIFICATION forming part of Letters Patent No. 448,623, dated March 24, 1891.

Application filed October 1, 1890. Serial No. 366,246. (No model.)

*To all whom it may concern:*

Be it known that I, HENRY AIKEN, of Pittsburg, in the county of Allegheny and State of Pennsylvania, have invented a new and useful Improvement in Mill Appliances, of which the following is a full, clear, and exact description, reference being had to the accompanying drawings, forming part of this specification, in which—

Figure 8:
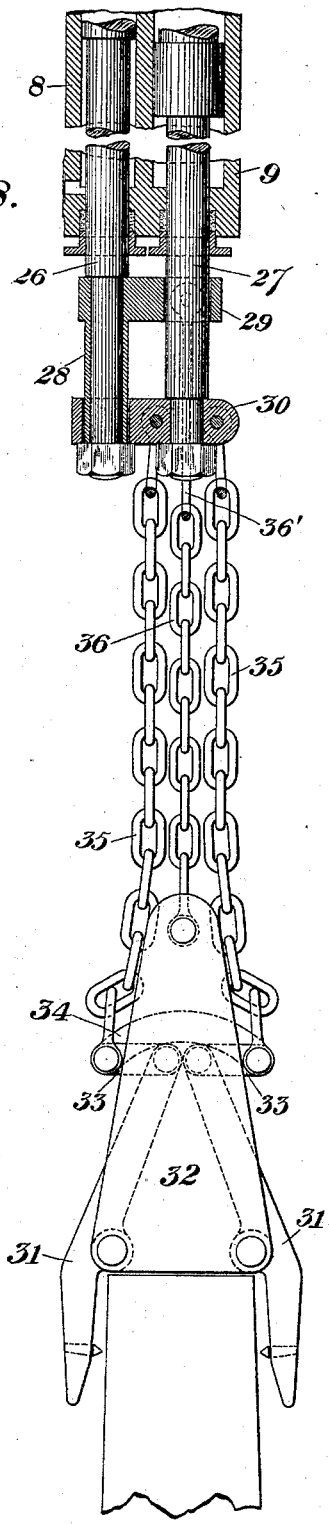
Figure 9:
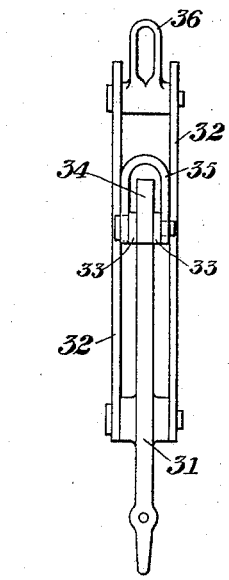

Figure 1 is a plan view showing my improved apparatus in a mill. Fig. 1ª is a detail view showing the joint of the water-conducting pipes. Fig. 2 is a sectional elevation, the section being on the line II II of Fig. 1. Fig. 3 is a compound view, the part to the left of the sheet being an end elevation and the part to the right being a cross-sectional elevation on the lines III III of Fig. 1. Fig. 4 is an enlarged sectional elevation on the line IV IV of Figs. 1 and 2. Fig. 5 is a vertical longitudinal section on the same scale as Fig. 4, showing the mechanism for moving the trolley. Fig. 6 is an enlarged central sectional view showing the swinging joints of the water-connections at A, B, and C. Fig. 7 is a similar sectional view of the joints at D, E, and F. Fig. 8 is an enlarged sectional elevation showing the ends of the lifting-cylinders and the manner of their connection with the tongs; and Fig. 9 is a side elevation of the tongs shown in Fig. 8.

Like symbols of reference indicate like parts in each.

The purpose for which I have especially designed my improved apparatus is to convey steel ingots from the casting-pit to the soaking-pits or heating-furnaces and from the latter to the mill, in which they are rolled into blooms. It will be understood, however, that unless expressly so stated in the claims the invention is not restricted to such use, but is of general application.

In the drawings, referring especially to Figs. 1, 2, and 3, 2 2 are the soaking-pits, in which the ingots are reheated as a step preparatory to their rolling.

3 is a track leading from the place in the mill where the ingots are cast, and 4 is a track leading to the blooming-mill. For the purpose of transferring the ingots to the soaking-pits from cars on the track 3, and from the soaking-pits to cars on the track 4, I use a traveling crane of novel construction. As shown in Figs. 1 to 5, the frame-work or bridge of the crane is composed of parallel beams 1, and has at its ends wheeled trucks 5, mounted on elevated tracks 6, which extend over the soaking-pit plant.

7 is a trolley mounted on the bridge of the crane between the parallel beams thereof. For the purpose of keeping the trolley steadily on the bridge, I prefer to provide each of its wheels with a peripheral groove, which, as shown in Figs. 1 and 4, fits on a longitudinally-projecting ridge or track on the bridge. This trolley carries upright cylinders 8 and 9, the construction of which is hereinafter described, and which are adapted to operate the tongs by which the ingots are seized and lifted. This trolley is movable from end to end on the crane-bridge, and the bridge itself is movable on the elevated track 6, so that facility is afforded for manipulating the ingots at any part of the soaking-pit plant. For the purpose of moving the bridge along the track 6, I employ a hydraulic motor 10, supported by the frame-work of the bridge, and having its plunger connected by a rack with a pinion 11, whose shaft 11' is journaled in bearings on the bridge and is provided with a beveled gear-wheel 12, which meshes with a pinion 13 on a shaft 14, which extends longitudinally of the bridge, being journaled in brackets 15 thereon, and at its ends is coupled to the axles of the wheels of the bridge, so that when the shaft is driven it will cause these wheels to rotate and to drive the bridge along the elevated track. To move the trolley back and forth on the bridge, I employ a second motor 16, which is carried by the bridge, and whose plunger is connected by rack mechanism with a pinion 17, fixed to a shaft 18, which shaft is connected by gearing 19 with a second shaft 20, preferably journaled at a higher level on the beams of the bridge. To this shaft 20 are fixed sprocket-wheels 21 and sprocket-chains 23, which extend from the wheels 21 over sprocket-wheels 22, journaled at the other end of the bridge. These chains 23 are endless chains, and are fixed to the trolley 7, as shown in Figs. 1 and 2, so that by driving the shaft 20 the chains are actuated so as to move the trolley on the bridge in one direction or the other, according to the direction of rotation of the shaft.

In Fig. 5 I show in detail the construction of the cylinder 16, and as both cylinders 10 and 16 are preferably constructed in like manner the description of one will serve for both. The cylinder is compound—that is to say, it is composed of two single-acting cylinders set with their ends opposite to each other with a lateral opening between them. A rack-bar 24 is fitted longitudinally in the cylinders, and at its end is provided with packing 25, constituting in each cylinder a plunger-head. The rear side of the rack-bar 24 is of circular arc in cross-section and bears against the walls of the cylinders. The other side of the bar is toothed and is in gear with the pinion 17 at the lateral opening, before mentioned. The water-supply pipes enter the ends of the cylinders, and by the admission of water at one pipe or the other the plunger may be moved longitudinally to rotate the pinion in either direction. A compound cylinder of like construction is shown and described in a prior patent, application Serial No. 363,652, filed September 1, 1890, and in said application I describe its advantages and claim the novel features thereof.

I shall now describe the construction and arrangement of the cylinders 8 and 9, which are carried by the trolley, and which serve to operate the ingot-tongs. These cylinders, which are set parallel to each other in vertical position, may be made of the same casting, as shown in Fig. 4, and have parallel plungers 26 and 27 projecting from the lower ends. The cylinders are single-acting, and their water-supply pipes enter them below the ends of the plungers. On the end of the plunger 26 is fixed a sleeve 28, having a cross-head 29, which loosely fits around the plunger 27.

30 is a cross-head fixed to the end of the plunger 27 and fitting loosely around the sleeve 28 on the plunger 26. When the parts are thus constructed, it is obvious that both plungers can be moved together to the full limits of the stroke of their cylinders, but that they are only capable of independent motion for a space equal to the distance between the heads 29 and 30. The tongs are clearly shown in Figs. 2 and 8. They comprise two arms 31, which are pivoted to a metal frame 32, and at their upper ends are connected by links 33 to a cross-head 34, which by means of chains 35 are connected to the part 30. The frame 32 is connected by a chain 36 with a shackle 36' on the head 29. When it is desired to close the tongs, water is admitted into the cylinder 9, so as to lift the plunger 27 and to elevate the cross-head 30 into contact with the cross-head 29, and thereby to cause the weight of the tongs and of their burden to be borne by the chains 35. These chains, acting on the arms 31 through the links 33, tend to draw the jaws of the tongs together upon an interposed ingot, and by causing the lifting force to be exerted by means of this plunger the pressure of the jaws on the ingot is proportioned to the weight of the latter. When the ingot is thus grasped, it can be raised or lowered by vertical motion of the plunger 27, which will carry with it the other plunger 26. If it be desired to open the tongs, I raise the plunger 26, and thereby lift the cross-head 29 and cause the weight of the tongs to be borne by the chain 36. By thus relieving the burden from the jaws of the tongs the weight of the cross-head 34 exerted upon the links will automatically open the jaws and release the ingot. This opening of the tongs can be effected at any position of the plunger 27. By using tongs of this construction, having their jaws connected by a cross-head, I attain important advantages. The power exerted by the ingot in tending to close the jaws is greatly increased by the system of leverage afforded by the cross-head and links, and as the lateral motion of the parts of the tongs is but slight, they can be used to lower ingots into and to seize ingots in soaking-pits of small width. The latter is an advantage not possessed by tongs of any other construction known to me. The apparatus for operating the tongs is also very advantageous. The cylinders put the tongs under perfect control, and the connection of the tongs to the two plungers prevents the tongs from rotating on their support and keeps them in proper position to enter the soaking-pits and to seize the ingots.

I shall now describe the means which I employ for supplying power to the apparatus and for operating it: The main water supply and exhaust pipes are carried by a crane having an upright mast 68, which is journaled at its top and base, so as to be capable of oscillation on its vertical axis, a horizontal jib 37, and an arm 38, which is pivotally connected to the end of the jib and to the bridge of the traveling crane. The pivotal joint of the arm 38 to the bridge is shown at 39 in Fig. 4. The main supply and exhaust pipes 40 41 may be extended from the ground along the mast 63, and thence along the jib 37 and arm 38 to the bridge. At the mast and at the joints between the jib and arm and arm and bridge these pipes are provided with swivel-couplings A, B, and C, whose axes of rotation are in the same vertical lines as the axes of the respective joints at the mast, jib, arm, and bridge. In order to bring the axis of the swiveled coupling A into line with the axis of rotation of the crane-mast, the upright beams of said mast are preferably offset somewhat from the line connecting the axes of its top and bottom bearings, as shown in Fig. 3. These couplings are preferably of peculiar construction, hereinafter described. From the coupling C the pipes 40 and 41 extend along the bridge to the common supply and exhaust ports of a nest of valves 42, Figs. 2, 3, and 4. From these valves pipes 43 and 44 lead along the bridge to a swiveled coupling F, and from thence they extend, as jointed walking-pipes, to a swiveled coupling D on the trolley 7, the elbow-joint of the walking-pipes being constituted by a swiveled coupling E. From the coupling D the pipes extend to the ports of the respective cylinders 8 and 9. The cylinder 16 is supplied with water by pipes 45 and 46, which extend from one of the valves 42 and enter the opposite ends of the cylinder. The cylinder 10 is supplied in like manner by pipes 47 and 48, which extend from another of said valves. Each of the valves 42 has a separate operating-lever 49, by which its delivery-pipes may be connected with the main supply or exhaust port, as desired. These valves and levers are placed in a pulpit or platform 50, suspended by beams 51 from the bridge, in which pulpit the operator rides, and from which he can see all the operative parts of the crane and can control their motions.

The general operation of the apparatus is as follows: To pick up an ingot from a car on one of the tracks, the operator, by admitting water to the cylinders 10 and 16, moves the bridge over the car and moves the trolley on the bridge, so that the cylinders 8 and 9 shall be directly above the ingot. The plungers of the latter cylinders are then lowered to cause the tongs to fit over the ingot, and then by elevating the plunger 27 the jaws of the tongs are closed on the ingot and the ingot is lifted from the car. The trolley and bridge are then moved to bring the ingot directly over the mouth of the soaking-pit, and the plungers 26 and 27 are lowered to let the ingot into the pit. Then by raising independently the plunger 26 the jaws are released from the ingot, leaving the tongs free to be withdrawn by elevation of the plungers. The operation required for withdrawing an ingot from a pit and placing it on a car is performed in reverse order to that above described. The tongs are carried above the pit, then lowered into the same by descent of the plungers 26 and 27, so that the jaws shall inclose the ingot, and then by lifting the plunger 27 the jaws are closed and the ingot lifted. The ease and rapidity of operation and the automatic nature of the work thus performed by the apparatus will be appreciated by those skilled in the art. It results in a material saving of labor and expense in the work of the plant in which the apparatus is employed. The means of supplying water to the apparatus is especially worthy of note. The jib 37 and arm 38 support the water-pipes and swing radially with the motions of the bridge, so as to support the pipes and to maintain the water-connection at every position of the latter, and, as they are capable of a very long sweep, they enable the travel of the bridge to be correspondingly long. This supporting of the water-pipes by swinging arms I regard as altogether new. It is valuable because it takes the burden of the pipes from the joints, and thus relieves the latter of much of the work that they have to perform and correspondingly diminishes the danger of breaking or straining them.

I shall now describe the construction of the swiveled pipe-couplings A, B, C, D, E, and F. As before indicated, the axes on which the respective couplings are swiveled are in the same line with the pivots of the joints between the mast and jib, the jib and arm, and the arm and bridge.

In Fig. 6, $a\,a$ is the axis of the coupling, and in Fig. 7 the line $b\,b$ represents such axis.

In Fig. 6, 52 is the central head, having water-passages 53 and 54, to which the water-pipes at one side of the coupling are connected. These passages 53 and 54 extend in opposite directions and terminate in necks 55, whose centers are coincident with the line $a\,a$. The ends of these necks are closed, but the passages 53 54 have lateral openings 56 through said necks. Around each of the necks 55 is a box 57, whose internal diameter is sufficiently larger than the external diameter of the neck to permit the interposition of packing rings and glands, hereinafter described, and in each box is formed an annular water-passage 58. The water-pipes leading from the couplings are connected with said water-passages 58, as shown. In the annular space between the neck 55 and the interior surface of the box 57 I place packing-rings 59, at both ends of the holes 56, and in the middle, directly opposite said holes, is a perforated metal ring 60. Outside the packing-rings I set an annular follower 61, which is connected with the box 57 by pins 64, passing through slots in a flange on the follower, or by other suitable means, so that it shall rotate with the box. A screw 62, which bears on a ring 65, against which the follower has a bearing, affords the means for compressing the follower on the packing-rings. The end of the packing has a bearing on an annular lip $c$, formed on the box 57. The construction of the coupling at both ends may be the same as above described.

It is evident that as the parts by which the pipes are upheld swing to adjust themselves to the travel of the bridge the coupling will likewise adjust itself by the boxes 57 turning on the necks at the ends of the central part 52. The packing 59 will also turn with the box, and as said packing bears at the end on the lip $c$, which moves with it, I prevent the wear which would occur if the end of the packing had a bearing against a stationary surface.

An important feature of construction of the coupling is the fact that the end of the neck 55 is closed and the connection with the encircling box is through the side of the neck. By these means the pressure on the box in both directions is balanced, and I render unnecessary the use of specially-constructed heavy clamps to prevent the box from being blown from place by the heavy water-pressure to which it is put when in use. I also regard as important the location of the water-passages at the middle of the packing in the annular stuffing-boxes, between the parts 55 and 57, which results in an equilibrium or balance of inward and outward pressure on the packing.

The coupling illustrated in Fig. 7 is made on the same principle, but is somewhat modified in form to suit its different situations in the apparatus. In this coupling the water-passages in the central head 52' extend in the same direction and then diverge at right angles in opposite directions through necks 55' on the line $b\ b$. The water-connections of the pipes in the swiveled heads 57' and the arrangement of the packing are the same as in the construction illustrated in Fig. 6, the corresponding parts being indicated by the same reference-figures, distinguished in Fig. 7 by the prime (') mark.

I claim as my invention—

1. In tongs for ingots, &c., the combination of pivoted upright tong-arms, a cross-head pivotally connecting the ends of said arms above their fulcra, and two sets of supporting devices, such as chains, connected with the cross-head and with the fulcra of the arms, respectively, substantially as and for the purposes described.

2. In tongs for ingots, &c., the combination of a frame, upright tong-arms pivoted to said frame, a cross-head and links connecting the arms, and two sets of supporting devices, such as chains, connected with the cross-head and with the fulcra of the arms, respectively, substantially as and for the purposes described.

3. The combination, with the tongs having gripping-jaws, of two sets of supporting devices, such as chains, connected with the tongs and adapted to open and close them, respectively, and two cylinders having plungers connected with said supporting devices, substantially as and for the purposes described.

4. The combination, with tongs, of two cylinders having plungers connected with the tongs to support the same and to operate the jaws, said plungers being provided with a loose connection, whereby the plungers are capable of moving in unison, and are capable, also, of independent motion limited in extent, substantially as and for the purposes described.

5. The combination, with tongs, of two cylinders having plungers connected with the tongs to support the same and to operate the jaws, and cross-heads fixed, respectively, to one plunger and fitting loosely around the other, whereby the plungers are capable of moving in unison, and are capable, also, of independent motion limited in extent by the cross-heads, substantially as and for the purposes described.

6. The combination of the trolley and a motor for moving the trolley, said motor comprising two cylinders having piston-heads therein, a toothed bar connecting the piston-heads, a chain connected with the trolley, and driving mechanism connected with the chain and in gear with the toothed bar, substantially as and for the purposes described.

7. The combination of the traveling bridge and a motor mounted on the bridge, comprising two cylinders having piston-heads therein, and a toothed bar connecting the piston-heads and in gear with the driving mechanism of the bridge, substantially as and for the purposes described.

8. The combination of the traveling bridge mounted on wheels, a hydraulic cylinder on the bridge, and a rack-bar actuated by the cylinder and in gear with the bridge-wheels for driving the same, substantially as and for the purposes described.

9. The combination, with a traveling hydraulic apparatus, such as a traveling crane, of water-pipes leading thereto, and a swinging crane supporting the pipes, substantially as and for the purposes described.

10. The combination, with a traveling hydraulic apparatus, such as a traveling crane, of jointed swinging supporting-arms connected therewith, and water-pipes carried by the arms having swiveled joints whose axes are coincident with the axes of the joints of said arms, substantially as and for the purposes described.

11. The combination, with a traveling hydraulic apparatus, such as a traveling crane, of water-pipes leading thereto, and a swinging crane supporting the pipes, said crane comprising a mast, a jib, and a jointed arm 38, substantially as and for the purposes described.

In testimony whereof I have hereunto set my hand this 23d day of September, A. D. 1890.

HENRY AIKEN

Witnesses:
W. B. CORWIN,
THOMAS W. BAKEWELL.